(12) United States Patent
Zesch et al.

(10) Patent No.: US 11,767,045 B2
(45) Date of Patent: Sep. 26, 2023

(54) COLLAPSIBLE CARTS

(71) Applicant: Rubbermaid Commercial Products LLC, Atlanta, GA (US)

(72) Inventors: Brian Zesch, Mooresville, NC (US); Tyler Stanley Switzer, Mooresville, NC (US); Ryan M. Baker, Charlotte, NC (US); Jeffrey S. Bertucci, Denver, NC (US); Juan Carlos Perez, Huntersville, NC (US)

(73) Assignee: RUBBERMAID COMMERCIAL PRODUCTS LLC, Atlanta, GA (US)

( * ) Notice: Subject to any disclaimer, the term of this patent is extended or adjusted under 35 U.S.C. 154(b) by 30 days.

(21) Appl. No.: 17/697,510

(22) Filed: Mar. 17, 2022

(65) Prior Publication Data

US 2022/0306172 A1 Sep. 29, 2022

Related U.S. Application Data

(60) Provisional application No. 63/164,817, filed on Mar. 23, 2021.

(51) Int. Cl.
*B62B 3/02* (2006.01)

(52) U.S. Cl.
CPC ............ *B62B 3/02* (2013.01); *B62B 2205/02* (2013.01); *B62B 2205/24* (2013.01); *B62B 2205/32* (2013.01)

(58) Field of Classification Search
CPC ... B62B 3/02; B62B 2205/02; B62B 2205/24; B62B 2205/32
See application file for complete search history.

(56) References Cited

U.S. PATENT DOCUMENTS

| | | | | |
|---|---|---|---|---|
| 2,938,632 A * | 5/1960 | Etienne | ................... | A47B 31/04 108/106 |
| 3,093,247 A * | 6/1963 | Erickson | ................ | A47B 43/00 211/149 |
| 3,656,439 A * | 4/1972 | Domin | ................... | A47B 3/083 108/115 |
| 4,740,010 A * | 4/1988 | Moskovitz | ............. | A47B 31/04 108/177 |
| 5,806,864 A * | 9/1998 | Zielinski | ................... | B62B 3/02 280/42 |

(Continued)

*Primary Examiner* — Erez Gurari
(74) *Attorney, Agent, or Firm* — Eversheds Sutherland (US) LLP (57) ABSTRACT

A collapsible cart may include a collapsible frame, a foldable shelf, and an interior support column. The collapsible frame includes a first frame portion and a second frame portion. The frame is configured to move between an open configuration and a collapsed configuration by relative translation between the first frame portion and the second frame portion. The foldable shelf extends between the first frame portion and the second frame portion. The foldable shelf is configured to fold to allow the frame to move from the open configuration to the collapsed configuration. The column transversely extends through a column slot defined by the foldable shelf. The cart further includes at least one column brace slidably coupling the frame to the column. The cart further includes at least one shelf brace slidably coupling the foldable shelf to the column.

20 Claims, 10 Drawing Sheets

(56) References Cited

U.S. PATENT DOCUMENTS

| | | | | |
|---|---|---|---|---|
| 6,349,962 B1 * | 2/2002 | Johanson | ............... | B62B 3/02 |
| | | | | 280/42 |
| RE41,763 E | 9/2010 | Ng | | |
| 8,523,197 B2 | 9/2013 | Baatz et al. | | |
| 8,672,147 B2 * | 3/2014 | Lam | ..................... | A47F 7/18 |
| | | | | 211/85.3 |
| 9,474,368 B2 * | 10/2016 | Frankel | ............... | A47B 43/00 |
| 9,913,533 B1 * | 3/2018 | Ke | ..................... | B62B 3/002 |
| 10,292,491 B1 * | 5/2019 | Ke | ..................... | A47F 5/137 |
| 10,441,070 B2 * | 10/2019 | Boyer | ............... | A47B 3/083 |
| 10,464,588 B1 * | 11/2019 | Lin | ..................... | B62B 7/08 |
| 10,604,170 B1 * | 3/2020 | Davis | ................. | B62B 3/008 |
| 10,881,040 B1 * | 12/2020 | Herreid | ............... | B62B 5/00 |
| 11,096,521 B2 * | 8/2021 | O'Shaughnessy | .. | A47J 37/0713 |
| 11,116,313 B2 * | 9/2021 | Leung | ............... | A47B 43/00 |
| 11,246,408 B2 * | 2/2022 | Jiang | ................. | A47B 43/00 |
| D974,690 S * | 1/2023 | Zesch | ..................... | D34/21 |
| D981,675 S * | 3/2023 | Li | ........................... | D34/21 |
| 2002/0109441 A1 * | 8/2002 | Wang | ................. | A47B 43/00 |
| | | | | 312/258 |
| 2004/0238469 A1 * | 12/2004 | Ng | ..................... | B62B 3/02 |
| | | | | 108/167 |
| 2010/0326938 A1 * | 12/2010 | Zhu | ..................... | A47F 5/10 |
| | | | | 211/150 |
| 2011/0253660 A1 * | 10/2011 | Pong | ................. | A47B 43/00 |
| | | | | 211/198 |
| 2020/0223463 A1 * | 7/2020 | Chen | ................. | B62B 3/02 |
| 2020/0405050 A1 * | 12/2020 | Liu | ..................... | A47B 43/00 |
| 2021/0146981 A1 * | 5/2021 | You | ..................... | B62B 3/022 |
| 2021/0378398 A1 * | 12/2021 | Doherty | ............. | A47B 43/00 |

\* cited by examiner

COLLAPSIBLE CARTS

CROSS-REFERENCE TO RELATED APPLICATION

This application claims the benefit of U.S. Provisional Application No. 63/164,817 filed Mar. 23, 2021, which is incorporated by reference herein in its entirety.

BACKGROUND

Carts can be moved to transport objects. Carts may be pushed or pulled by a person. Carts typically take up substantial space in order to hold a larger number of objects on the cart.

TECHNICAL FIELD

The present disclosure relates generally to carts, for example, carts that can be moved to transport objects.

DESCRIPTION OF THE RELATED ART

Carts may be used to hold, store, and transport objects. For example, carts may have shelves to hold objects, and be pushed or pulled to transport the objects. Carts may be sold fully assembled, or as parts to be assembled by users.

SUMMARY

The present disclosure describes collapsible carts, for example, wheeled carts, that can be moved to transport objects. For example, objects may be placed in the carts, and the carts may be pushed or pulled by a person. The carts may be collapsed for storage or transport.

In embodiments, a collapsible cart includes a collapsible frame, a foldable shelf, and an interior support column. The collapsible frame includes a first frame portion and a second frame portion. The frame is configured to move between an open configuration and a collapsed configuration by relative translation between the first frame portion and the second frame portion. The foldable shelf extends between the first frame portion and the second frame portion. The foldable shelf is configured to fold to allow the frame to move from the open configuration to the collapsed configuration. The column transversely extends through a column slot defined by the foldable shelf.

The cart further includes at least one column brace slidably coupling the frame to the column. The cart further includes at least one shelf brace slidably coupling the foldable shelf to the column.

In embodiments, a collapsible cart includes a collapsible frame, shelves, a column, and braces. The collapsible frame includes a front frame portion and a rear frame portion. The collapsible frame is configured to move between an open configuration and a collapsed configuration by relative translation between the front frame portion and the rear frame portion.

The shelves include an upper foldable shelf, a middle foldable shelf, and a lower foldable shelf. Each of the upper, middle, and lower folding shelves extend between the front frame portion and the rear frame portion. Each of the upper, middle, and lower folding shelves are configured to fold to allow the frame to move from the open configuration to the collapsed configuration.

The interior support column extends from the upper foldable shelf to the lower foldable shelf through a column slot defined by the middle foldable shelf.

The braces include a front column brace slidably coupling the front frame portion to the column, a rear column brace slidably coupling the rear frame portion to the column, a front shelf brace slidably coupling a front portion of the middle foldable shelf to the support column, and a rear shelf brace slidably coupling a rear portion of the middle foldable shelf to the support column.

It is to be understood that the invention is not limited in its application to the details of construction and the arrangement of components illustrated in the drawings or set forth in the following description.

DETAILED DESCRIPTION

The present disclosure describes collapsible carts that can be used to store or transport objects in an open configuration, and may be collapsed to a closed configuration for compact and efficient storage.

In embodiments, a collapsible cart includes a collapsible frame, a foldable shelf, and an interior support column. The collapsible frame includes a first frame portion and a second frame portion. The frame is configured to move between an open configuration and a collapsed configuration by relative translation between the first frame portion and the second frame portion. The foldable shelf extends between and connects the first frame portion and the second frame portion. The foldable shelf is configured to fold to allow the frame to move from the open configuration to the collapsed configuration. The column transversely extends through a column slot defined by the foldable shelf. The cart further includes at least one column brace slidably coupling the frame to the column. The cart further includes at least one shelf brace slidably coupling the foldable shelf to the column.

In embodiments, a collapsible cart includes a collapsible frame, shelves, a column, and braces. The collapsible frame includes a front frame portion and a rear frame portion. The collapsible frame is configured to move between an open configuration and a collapsed configuration by relative translation between the front frame portion and the rear frame portion.

The shelves include an upper foldable shelf, a middle foldable shelf, and a lower foldable shelf. Each of the upper, middle, and lower folding shelves extend between and connects the front frame portion and the rear frame portion. Each of the upper, middle, and lower folding shelves are configured to fold to allow the frame to move from the open configuration to the collapsed configuration.

The interior support column extends from the upper foldable shelf to the lower foldable shelf through a column slot defined by the middle foldable shelf. The braces include a front column brace slidably coupling the front frame portion to the column, a rear column brace slidably coupling the rear frame portion to the column, a front shelf brace slidably coupling a front portion of the middle foldable shelf to the support column, and a rear shelf brace slidably coupling a rear portion of the middle foldable shelf to the support column.

Carts according to the disclosure may be folded, for example, by pushing a first frame portion and a second frame portion together, with shelves folding to allow the cart to collapse. In the collapsed configuration, the first and second frame portions may be closer to each other than in the open configuration, providing a compact shape and arrangement that facilitates storage and transport of the cart. For example, the cart may be transported and stored by a manufacturer or a seller in the collapsed configuration, providing a reduced overall volume, thus reducing storage and transportation costs. The cart may be opened by a user, and collapsed by a user when the cart is not in use, thus allowing higher storage efficiency for the user. In embodiments, carts according to the disclosure may be entrained together.

Carts according to the disclosure thus may have a relatively small footprint when not in use, and may be used for both small and large capacity loads. Further structures such as braces may allow for synchronous and controlled folding of cart portions.

Figure 1A:
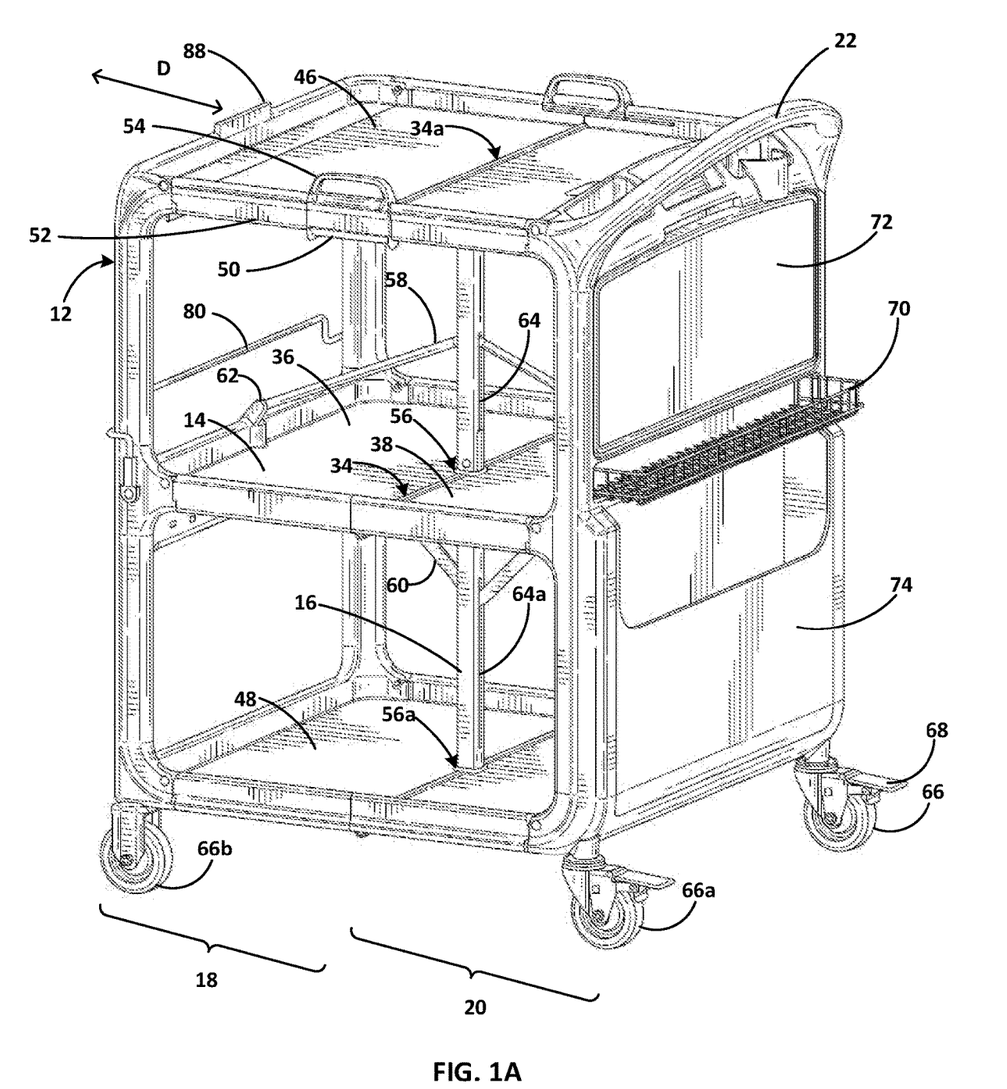
FIG. 1A is a perspective view of a collapsible cart including a collapsible frame, a foldable shelf, and an interior support column, in an open configuration.
Figure 1B:
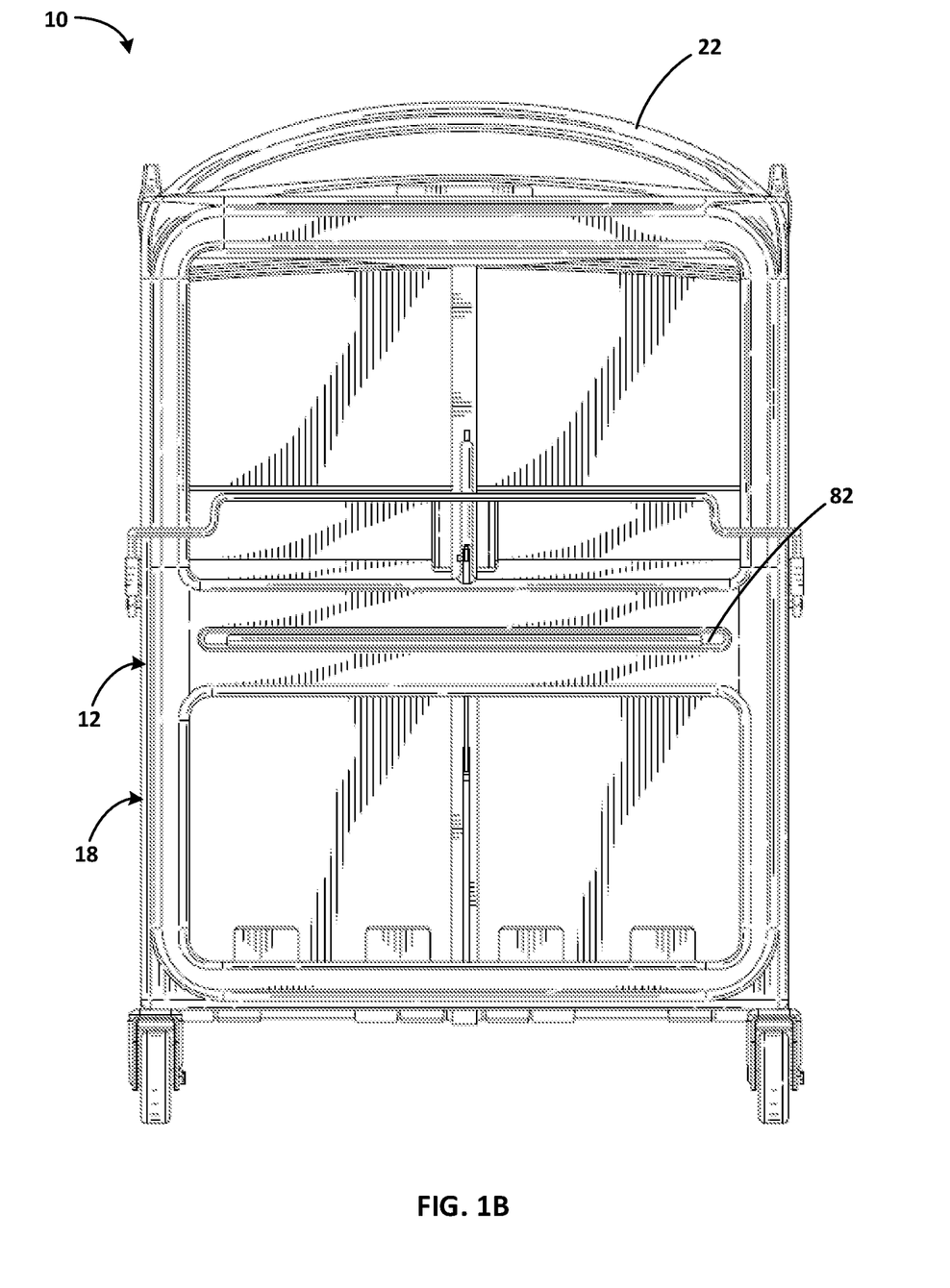
FIG. 1B is a front view of the collapsible cart of FIG. 1A.
Figure 1C:
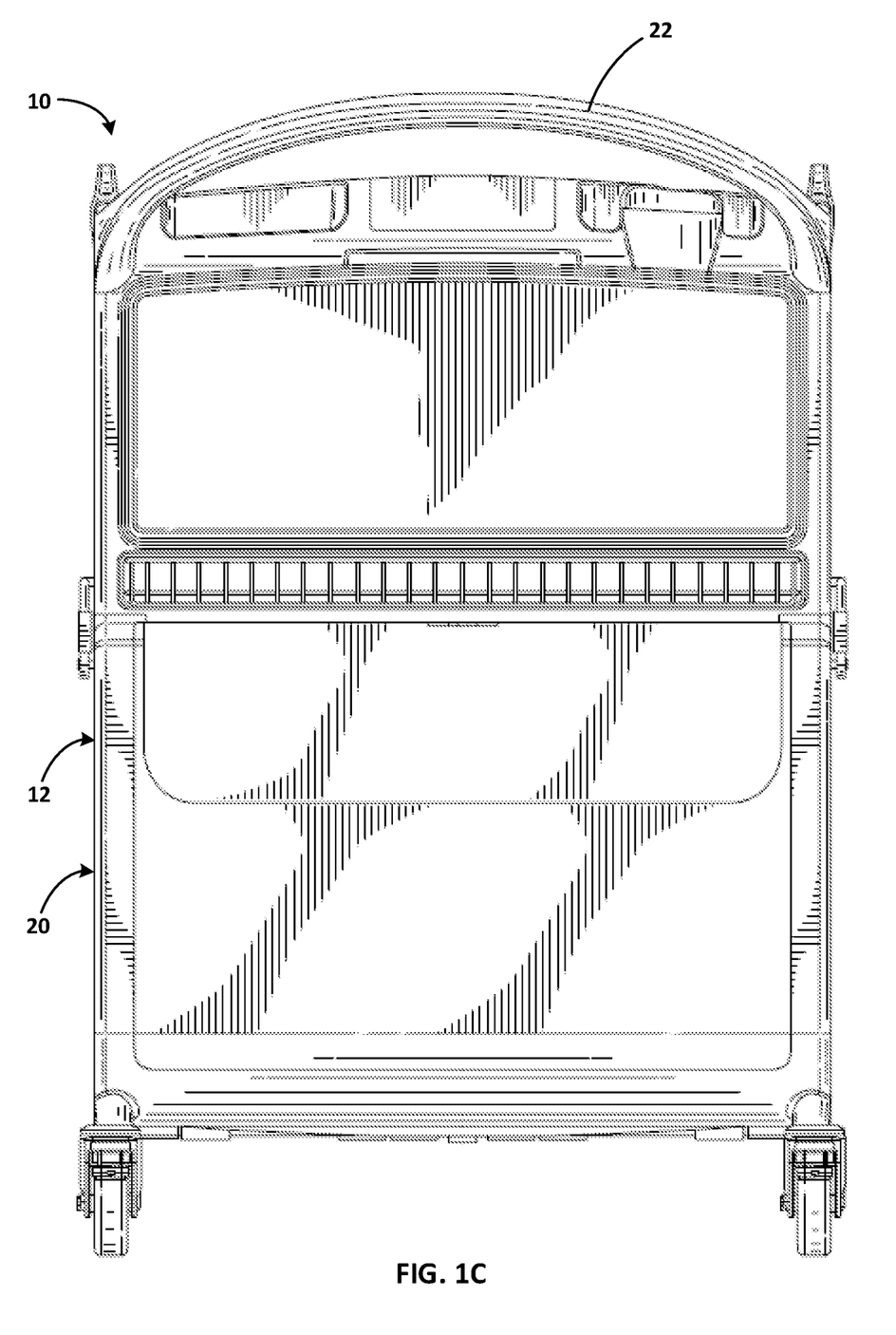
FIG. 1C is a rear view of the collapsible cart of FIG. 1A.
Figure 1D:
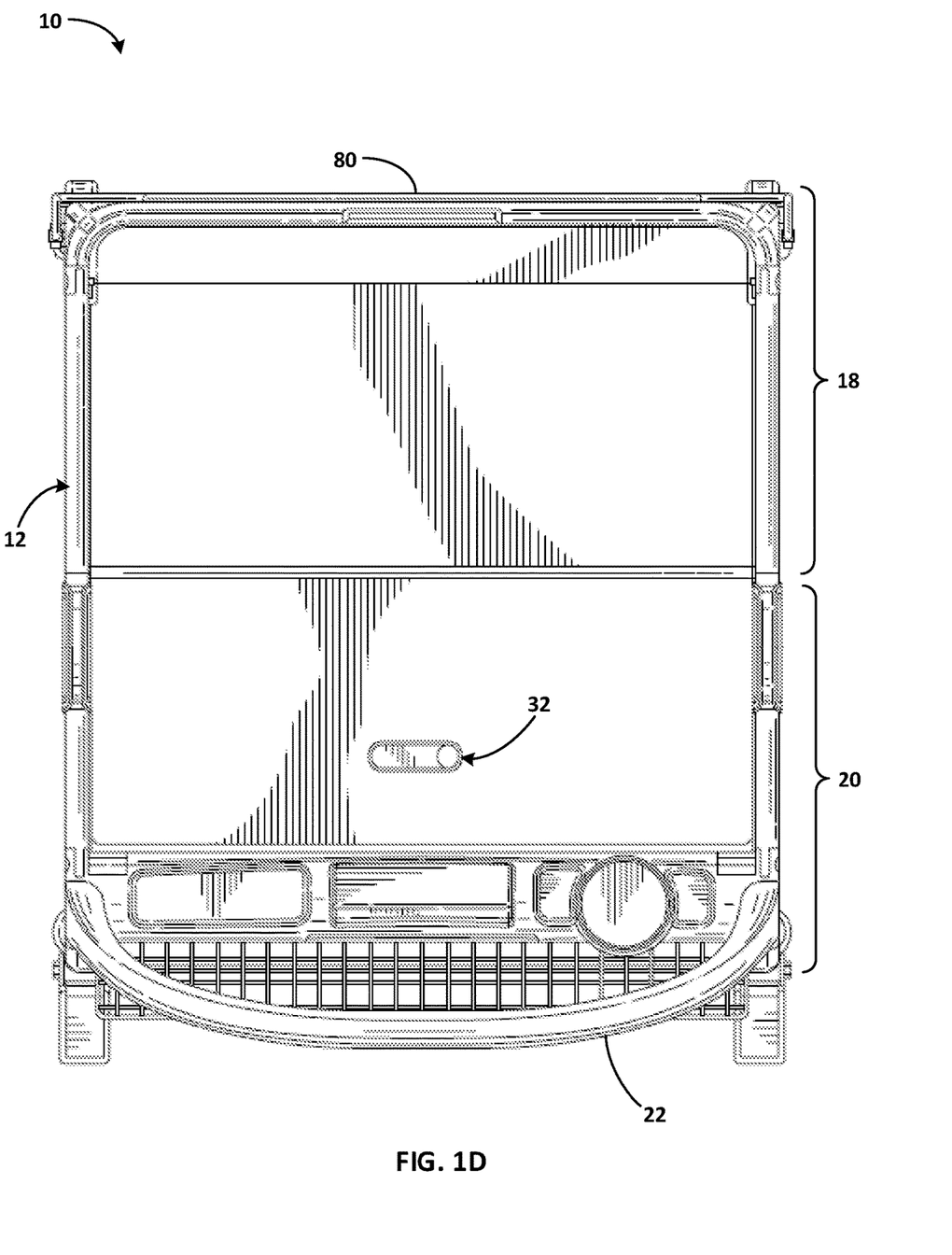
FIG. 1D is a top view of the collapsible cart of FIG. 1A.
Figure 1E:
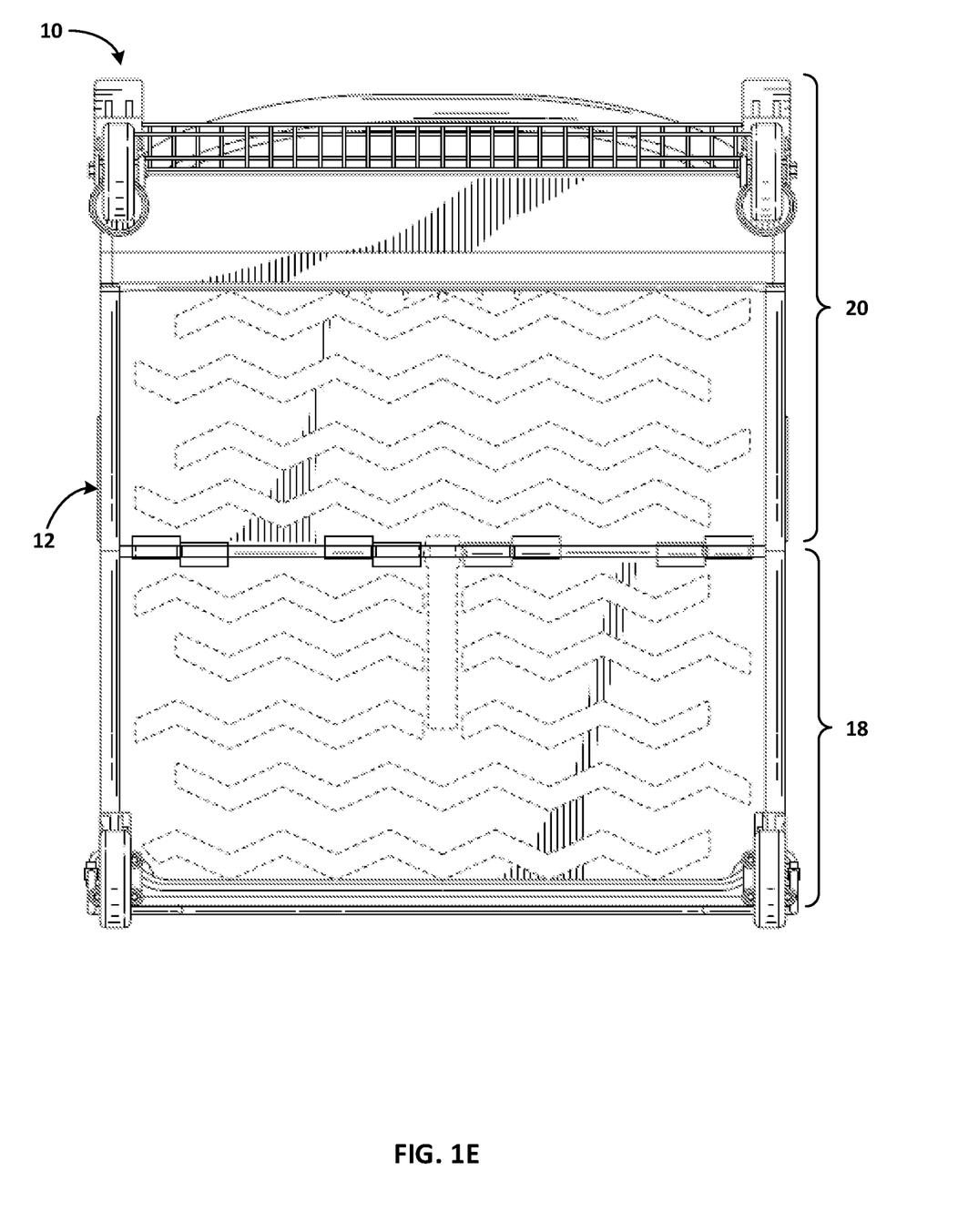
FIG. 1E is a bottom view of the collapsible cart of FIG. 1A.

FIG. 1A is a perspective view of a collapsible cart 10 including a collapsible frame 12, a foldable shelf 14, and an interior support column 16, in an open configuration. FIGS. 1B to 1F are, respectively, front, rear, top, bottom, and side views of collapsible cart 10 of FIG. 1A.

One or more components of the cart, for example, frame 12, foldable shelf 14, column 16, or other components, may be formed from any suitable material, for example, a material sufficiently rigid to hold and transport objects. For example, the material may include one or more of metals, alloys, or polymers.

Collapsible frame 12 includes a first frame portion 18 and a second frame portion 20. In embodiments, one or both of first frame portion 18 and second frame portion 20 are made of a rigid plastic material. In embodiments, one or both of first frame portion 18 and second frame portion 20 include metal or alloy reinforcing elements. Frame 12 is configured to move between an open configuration and a collapsed configuration by relative translation between first frame portion 18 and second frame portion 20. In some embodiments, both first and second frame portions 18 and 20 are moved toward each other to collapse cart 10 to a collapsed configuration (shown in FIG. 2), and away from each other to open cart 10 from the collapsed configuration. In other embodiments, or one of first and second frame portions 18 and 20 may be held static, while the other of first and second frame portions 18 and 20 is moved.

Figure 1F:
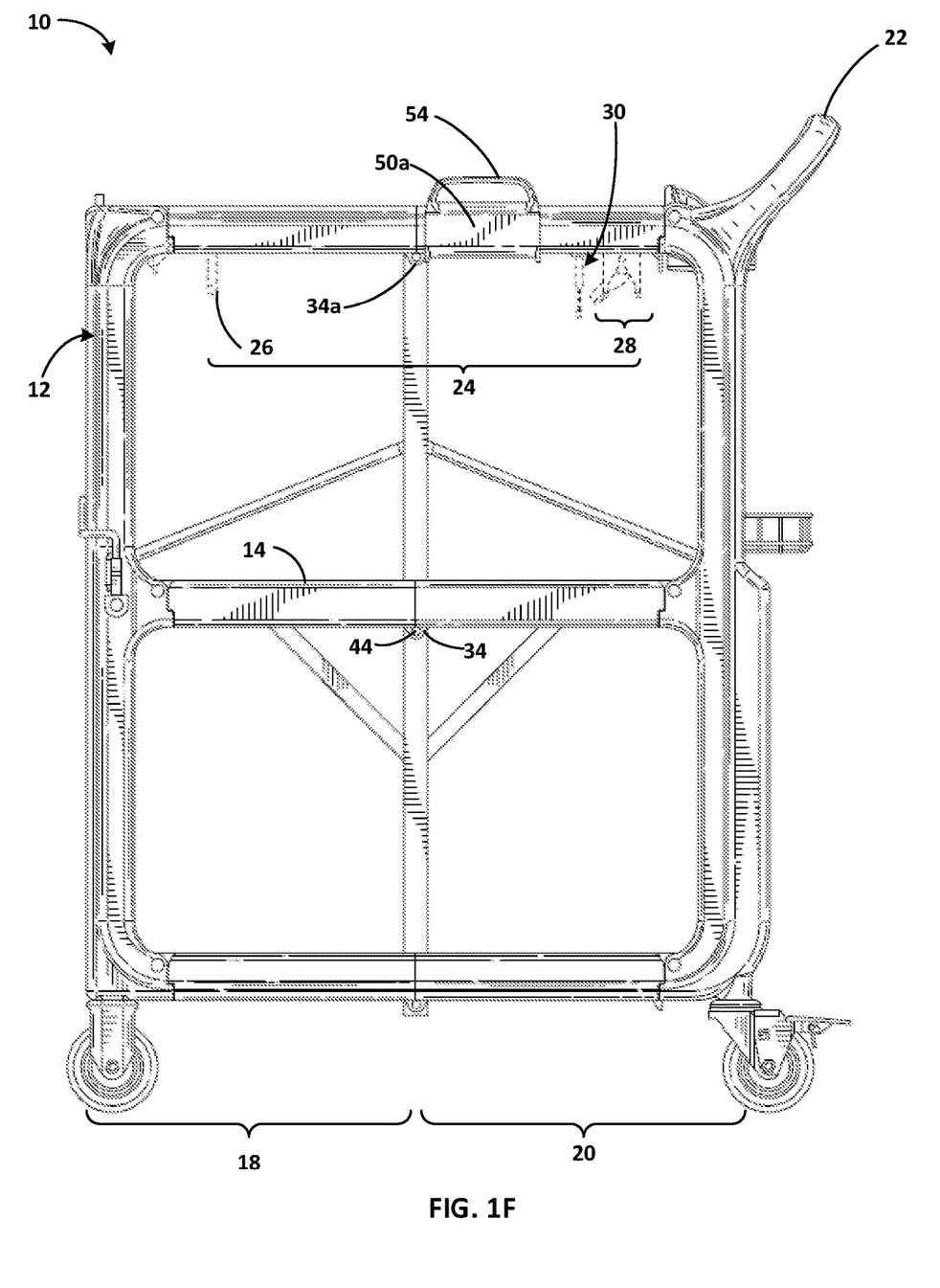
FIG. 1F is a side view of the collapsible cart of FIG. 1A.
Figure 2:
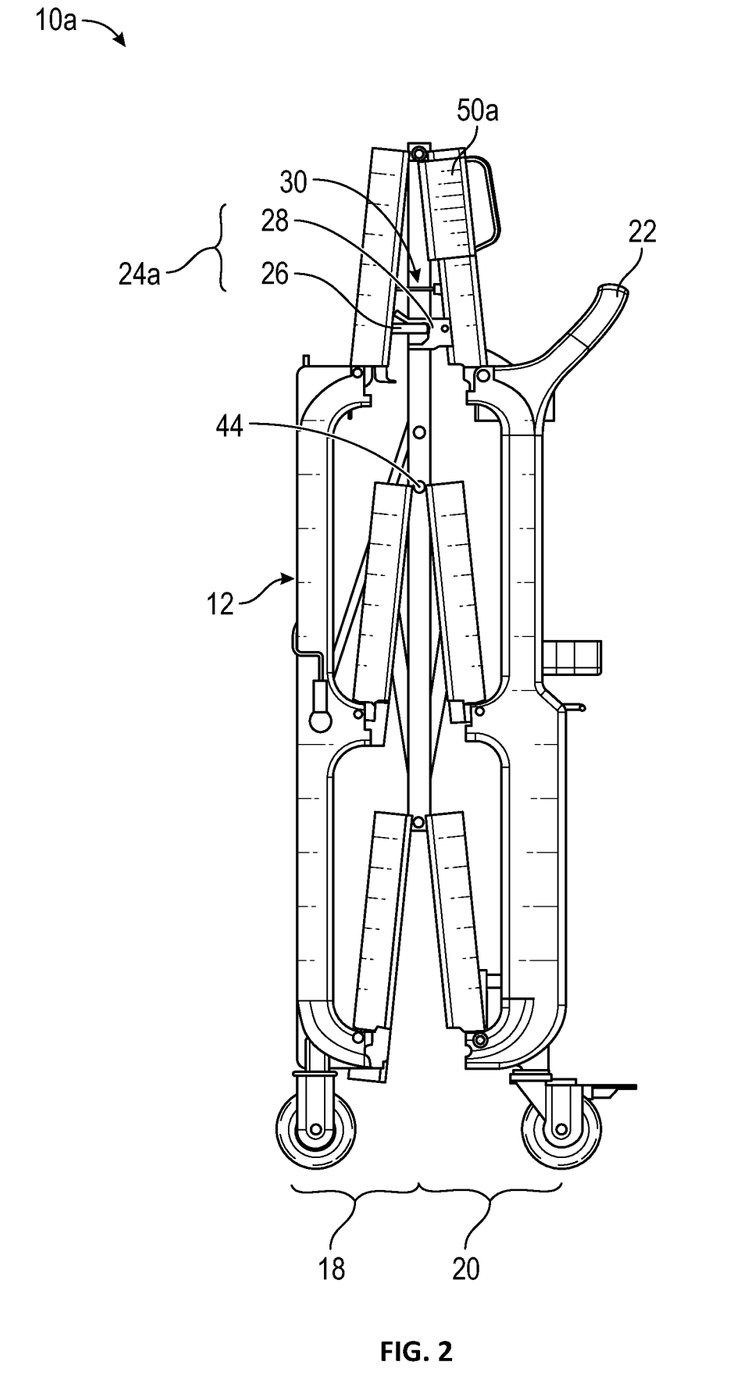
FIG. 2 is a side view of the collapsible cart of FIG. 1A in a closed configuration.

FIG. 2 is a side view of collapsible cart 10 of FIG. 1A in a collapsed configuration 10a. As seen in FIG. 2, in collapsed configuration 10a, first and second portions 18 and 20 are relatively closer than in open configuration 10 of FIGS. 1A to 1F. Thus, cart 10 is more compact, and may be stored or transported in a reduced volume, in configuration 10a of FIG. 2, relative to configuration 10 of FIG. 1A.

In embodiments, to avoid unintended opening from the collapsed configuration, or otherwise to secure first and second portions 18 and 20 of cart 10, collapsible frame 12 includes a latch assembly 24 for securing first frame portion 18 to second frame portion 20. In embodiments, latch assembly 24 includes a first latch portion 26 and a second latch portion 28. One of first and second latch portions 26 and 28 may be secured to or defined by one of first and second portions 18 and 20, and the other of first and second latch portions 26 and 28 may be secured to or defined by the other of first and second portions 18 and 20. The first latch portion 26 may be disposed on the first portion 18 and the second latch portion 28 may be disposed on the second latch portion. As shown in FIG. 1F, first latch portion 26 may include a latch bar, and second latch portion 28 may include a locking latch slot, such that first latch portion 26 is lockably received in second latch portion 28, coupling first and second latch portions 26 and 28.

When first and second latch portions 26 and 28 are coupled, for example, in collapsed configuration 10a including latched configuration 24a of latch 24 shown in FIG. 2, first and second cart portions 18 and 20 are secured to each other, and resist separation.

First and second cart portions 18 and 20 may be released from each other by causing detachment of first and second latch portions 26 and 28, unlatching latch assembly 24. In embodiments, cart 10 includes a release assembly 30 configured to release latch assembly 24 to permit opening of cart 10. For example, release assembly 30 may include one or more of a wire, a rod, a biasing element, or the like coupled to one or both of first and second latch portions 26 or 28.

In embodiments, release assembly 30 further includes a release button 32, for example, as shown in FIG. 32. In such embodiments, pressing release button 32 causes detachment of first and second latch portions 26 and 28, unlatching latch assembly 24. For example, release button 32 may be pressed in configuration 10a shown in FIG. 2, allowing cart 10 to be opened to the open configuration of FIG. 1A.

In embodiments, first frame portion 18 is a front frame portion, and second frame portion 20 is a rear frame portion, for example relative to a cart travel direction. During travel, cart 10 may be pushed or pulled, for example, by applying an appropriate force to cart 10 in an intended direction of travel.

In embodiments, cart 10 includes a handle 22. For example, second frame portion 20 may include handle 22. Handle 22 may include one or more of metal, alloy, or plastic. While handle 22 may be substantially continuous or unitary, as shown in FIG. 1A, in other embodiments, handle 22 may include two or more pieces.

During travel, cart 10 may be pushed by applying a pushing force on handle 22. In other embodiments, cart 10 may be pulled by applying a pulling force on handle 22. Regardless of whether cart 10 is pulled or pushed, the portion of cart 10 adjacent handle 22 may be considered as a nominal rear portion, and an opposing portion of cart 10 may be considered as a nominal front portion. Thus, in such embodiments, cart 10 may be collapsed along a front-to-back or back-to-front direction along axis D.

In embodiments, first frame portion 18 is a left frame portion, and second frame portion 20 is a right frame portion, relative to a cart travel direction. For example, front frame portion 18 and second frame portion 20 may be movable in a direction transverse to a cart travel direction. In some such embodiments, and in embodiments in which cart 10 includes handle 22, handle 22 may also be foldable. Thus, in such embodiments, cart 10 may be collapsed along a right-to-left or left-to-right direction transverse to axis D.

In embodiments, cart 10 may not include handle 22, or may include more than one handle 22, for example handles at opposing sides of cart 10, or at three sides of cart 10, or at four sides of cart 10.

First and second portions 18 and 20 are spaced apart by foldable shelf 14, as shown in FIG. 1A. Foldable shelf 14 extends between first frame portion 18 and second frame portion 20. Foldable shelf 14 is configured to fold to allow frame 12 to move from the open configuration to the collapsed configuration. In embodiments, foldable shelf 14 includes a hinge 34. In some such embodiments, hinge 34 is positioned substantially along a middle of foldable shelf 14, for example, as shown in FIGS. 1A and 1F.

Figure 1G:
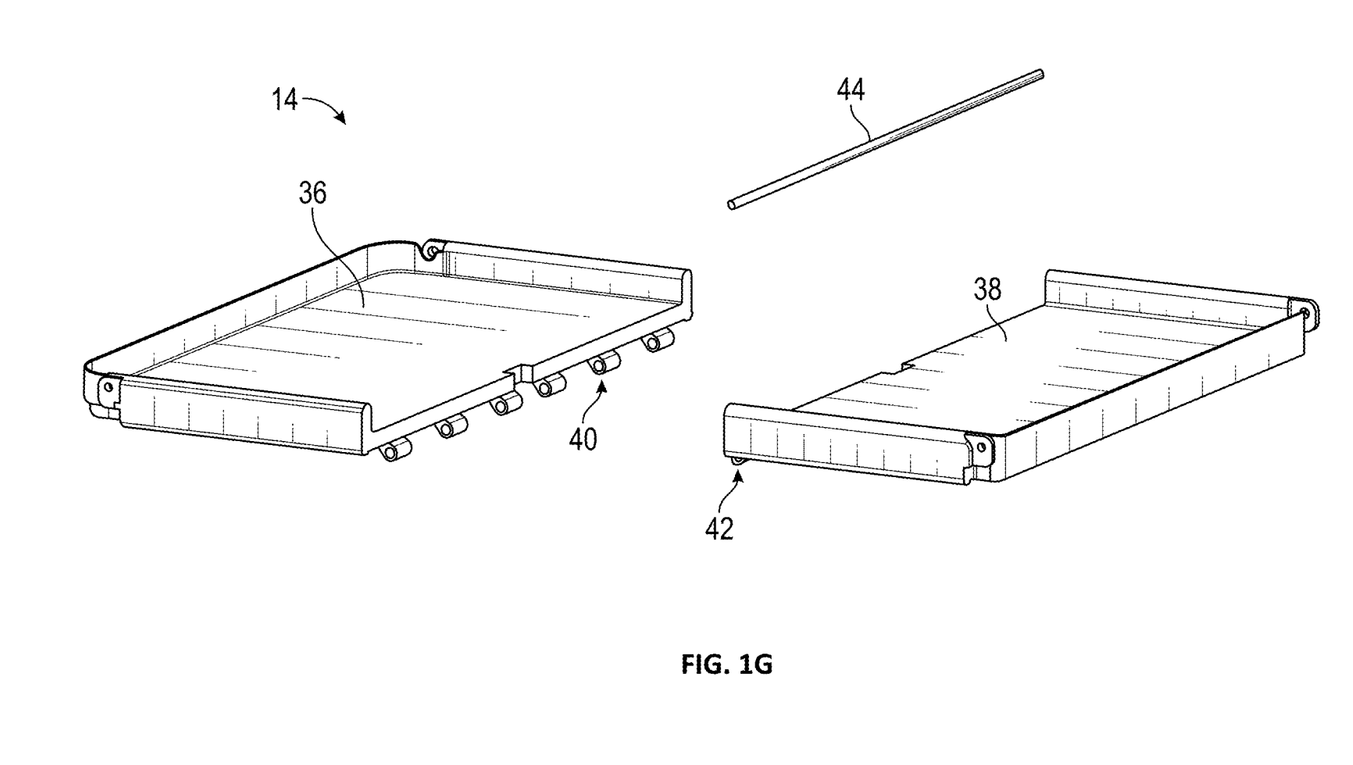
FIG. 1G is an exploded view of the foldable shelf of the cart of FIG. 1A.

FIG. 1G is an exploded view of shelf 14 according to some embodiments of cart 10. In some such embodiments, foldable shelf 14 includes a first shelf portion 36 and a second shelf portion 38. First shelf portion 36 may define a first hinge channel 40 of hinge 34, and second shelf portion 38 may defining a second hinge channel 42 of hinge 34. For example, first hinge channel 40 may be unitary with first shelf portion 36, and second hinge channel 42 may be unitary with second shelf portion 38, as shown in FIG. 1G. In other embodiments, first and second hinge channels 40 and 42 may be separately formed and respectively secured to first and second shelf portions 36 and 38.

In embodiments, shelf 14 further includes a hinge pin 44 securing first and second shelf portions 36 and 38. For example, hinge pin 44 may passing through first and second hinge channels 40 and 42 to secure first and second shelf portions 36 and 38. In embodiments, hinge pin 44 is formed of a metal or an alloy.

In embodiments, cart 10 includes a plurality of foldable shelves, and foldable shelf 14 is a respective shelf of the plurality of foldable shelves. For example, cart 10 may include two or more foldable shelves 14.

In embodiments, foldable shelf 14 is a middle foldable shelf, and collapsible cart 10 further includes an upper foldable shelf 46 above the middle foldable shelf 14. In embodiments, collapsible cart further includes a lower foldable shelf 48 below middle foldable shelf 14. Thus, cart 10 may include one, two, or three of upper foldable shelf 46, middle foldable shelf 14, or lower foldable shelf 48. Cart 10 may include a plurality of middle foldable shelves 14 between upper foldable shelf, for example, two or more middle foldable shelves 14.

In an embodiment, cart 10 includes upper foldable shelf 46, a single middle foldable shelf 14, and lower shelf 48, as shown in FIG. 1A.

Upper foldable shelf 46 and lower foldable shelf 48 may be foldable substantially in the same manner as foldable shelf 14. For example, upper and lower foldable shelves 46 and 48 may include a hinge substantially similar to hinge 34 described with reference to foldable shelf 14. Thus, each shelf in cart 10, including upper, middle, and lower shelves 46, 14, and 38, may fold to permit cart 10 to assume collapsed configuration 10a.

One or more shelves, such as shelves 14, 46, or 48, or other shelves, may be made of the same material, or of different materials. The shelfs may include one or more of plastic, metal, or alloy, or any suitable rigid material.

In embodiments, cart 10 further includes a shelf lock 50 configured to slide between a locked position (shown in FIG. 1A) that retains cart 10 in an open configuration and an unlocked position 50a (shown in FIGS. 1F and 2) that permits the cart 10 to fold. While shelf lock 50 is positioned along upper shelf 46 in the embodiment of FIG. 1A, in other embodiments, shelf lock 50 may be positioned along foldable shelf 14, or along lower shelf 48. Further, while a single shelf lock 50 is shown in FIG. 1A, in other embodiments, cart 10 may include more than one shelf lock 50. For example, each shelf may have a respective shelf lock, or more than one but less than all shelves may have respective shelf locks.

Further, it will be understood that while shelf lock 50 may directly lock upper shelf 46, it at least indirectly also locks other shelves 14 and 48, and cart 10 as a whole, for example, by at least partially resisting folding of other shelves or cart 10 as a whole.

In embodiments, shelf lock 50 may be positioned along or slidably secured to a rail 52. For example, upper shelf 46 may define a rail 52, and shelf lock may be slidably secured to rail 52, as shown in FIG. 1A. Other shelves may also define respective rails. Shelf lock 50 may slide along rail 52. Rail 52 may be integral with a respective shelf, for example, fabricated as a continuous extension of the shelf, or may be fabricated separately and secured to the shelf. Rail 52 may be formed from the same material as a respective shelf, or from a different material. For example, the rail and the shelf may be both formed of the same or different plastics, or one of the rail and the shelf may be formed of a plastic, and the other of the rail and the shelf may be formed of metal or alloy.

In embodiments, shelf lock 50 extends across a hinge of a foldable shelf in a locked position, and resists folding of the foldable shelf about the hinge. For example, as shown in FIG. 1A, shelf lock 50 may extend across a shelf hinge 34a of upper shelf 36, and resist folding of upper shelf 46.

Shelf lock 50 is spaced from the hinge in the unlocked position to allow folding of the hinge. For example, as shown in FIG. 1F, shelf lock 50 is moved away from shelf hinge 34a to unlocked configuration 50a, and cart 10 is ready to collapse. As shown in FIG. 2, shelf lock 50 remains spaced away from shelf hinge 34a in unlocked configuration 50a in the collapsed configuration 10a.

In embodiments, shelf lock 50 defines a grip 54 for holding and sliding shelf lock 50 along rail 52. Grip 54 may be unitary with shelf lock 50, or may be formed separately from shelf lock 50 and secured to shelf lock 50. Grip 54 may be formed of the same material as shelf lock 50, or of a different material. Grip 54 may be lined or coated with a material or coating that facilitates gripping of grip 54, for example, a material or coating that enhances friction, or otherwise be textured to facilitate manual gripping.

Cart 10 may include one shelf lock 50, or more than one shelf lock 50. Likewise, a respective shelf may include one shelf lock 50, or more than one shelf lock 50. In embodiments, one or more shelves may have no shelf locks, one or more shelves may have one shelf lock, and one or more shelves may have two shelf locks.

In embodiments, rail 52 is a first rail, and shelf lock 50 is a first shelf lock, and upper foldable shelf 46 (or another shelf) may define a second rail parallel to the first rail, and the collapsible cart may include a second shelf lock slidably secured to the second rail.

In this way, cart 10 may include one or more foldable shelves, such as foldable shelf 14, which spaces apart first and second cart portions 18 and 20 in an open configuration of cart 10, and which are foldable to permit collapse of cart 10 to collapsed configuration 10a.

Cart 10 may further include one or more columns, for example, one or both of exterior or interior columns, to promote stability of open and closed configurations of cart 10. An exterior column is a column positioned substantially adjacent or at a periphery of cart 10, and an interior column is column position inward of the periphery of cart 10. For example, an exterior column may be adjacent or at an edge or a rail of a foldable shelf of cart 10, while an interior column may pass through one or more foldable shelves of cart 10.

In embodiments, cart 10 includes an interior column 16, as shown in FIG. 1A. In some embodiments, column 16 includes metal or alloy, or consists of metal or alloy. In other embodiments, column 16 may include, instead of or in addition to metal or alloy, a rigid plastic, or another suitable material.

Column 16 may be formed as a single unitary piece, or may include multiple pieces secured to each other. In embodiments, the geometry of column 16, for example, a height of column 16, substantially remains the same in both the open and collapsed configurations of cart 10. In other embodiments, column 16 may be one or both of extendible of compressible, and may extend or compress in response to opening or collapse of cart 10.

In embodiments, column 16 transversely extends through a column slot 56 defined by foldable shelf 14. For example, while shelf 14 extends horizontally relative to gravity, column 16 may extend substantially vertically perpendicular to shelf 14. Column 16 may extend through other shelves, for example, other middle shelves, or through one or both of upper or lower shelves 46 or 48.

In embodiments, column 16 may extend through a slot 56a defined by lower shelf 48, with one end terminating adjacent lower shelf 48, and the other end terminating adjacent upper shelf 46, but without extending through upper shelf 46, as shown in FIG. 1A. In other embodiments, column 16 may extend through both upper and lower shelves 46 and 48, or may terminate at ends without extending through either of upper and lower shelves 46 and 48.

As cart 10 is collapsed, column 16 may move vertically upward, facilitating a smooth and stable collapse, by restraining and guiding folding of one or more foldable shelves about column 16. For example, without column 16, cart 10 may collapse non-uniformly or unevenly because one or more shelves may unevenly or non-uniformly fold. In embodiments with multiple shelves, the presence of column 16 may tend to promote substantially parallel and uniform folding (or unfolding) of all foldable shelves.

In embodiments, interior support column 16 is disposed between first frame portion 18 and second frame portion 20 in a direction from first frame portion 18 to second frame portion 20. In embodiments, column 16 may be positioned substantially centrally between left and right sides of cart 10. In embodiments, column 16 may be positioned substantially centrally between front and rear sides of cart 10, or may be offset along a front-to-back direction from center of cart 10.

Column 16 may be secured to cart 10 directly or indirectly. For example, one or more coupling elements may couple column 16 to cart 10, for example, one or both of first or second cart portions 18 or 20. Likewise, one or more coupling elements may couple column 16 to one or more shelf, for example, a top, or bottom of a shelf, or an edge of a shelf, or any other portion of cart 10 or a shelf of cart 10. The presence of such a coupling element may promote even and uniform opening and collapsing of cart 10, for example, by restraining and guiding relative movement of cart portions 18 and 20 and/or shelves such as shelf 14.

In embodiments, the coupling element may include a column brace 58, or a shelf brace 60.

In embodiments, cart 10 further includes at least one column brace 58 slidably coupling frame 12 to column 16. For example, one or both ends of column brace 58 may be slidable along frame 12 or column 16. In embodiments, one end of column brace 58 may be pivotably secured to frame 12 or column 16. In the embodiment shown in FIG. 1A, one end of column brace 58 is pivotably secured at pivot 62, and another end of column brace 58 is sliding secured along a column slot defined by column 16, such column slot 64 shown in FIG. 1A. Column slot 64 may be a single slot extend through opposing surfaces of column 16, or may be one of separate slots, each slot corresponding to a respective column brace. In embodiments, at least one column brace 58 has a first column brace end secured to collapsible frame 12 and a second shelf brace end slidably secured to support column 16.

In embodiments, at least one column brace 58 includes two, or more than two column braces coupled to support column 16. In the embodiment of FIG. 1A, cart 10 includes two column braces 58.

In embodiments, cart 10 further includes at least one shelf brace 60 slidably coupling foldable shelf 14 to column 16. For example, shelf brace 60 may have a first shelf brace end secured to foldable shelf 14 and a second shelf brace end slidably secured to support column 16. The second shelf brace end may be secured to a same column slot 64 described with reference to column brace 58, or another column slot, distinct from column slot 64. In embodiments, column slot 64 is a first column slot, and column 16 defines a second column slot 64a. In some such embodiments, column brace 58 is secured in first column slot 64, and shelf brace 60 is secured in second column slot 64a.

In embodiments, at least one shelf brace 60 includes at least two shelf braces coupled to foldable shelf 14. In the embodiment of FIG. 1A, cart 10 includes two shelf braces 60.

In embodiments, only middle shelf 14 (or other middle shelves) are coupled to one or more shelf brace 60, and upper and lower shelves 46 and 48 do not have shelf braces. In other embodiments, one or both of upper or lower shelves 46 or 48 may have shelf braces, instead of or in addition to, shelf braces associated with middle shelf 14.

Column brace 58 and shelf brace 60 may be formed of a substantially rigid material, for example, the same material as column 16, or a different material than column 16. In embodiments, column 16, column brace 58, shelf brace 60 are formed of the same or different metals or alloys.

One or both of column brace 58 or shelf brace 60 may cooperate with frame 12, shelf 14, and column 16, to promote smooth and even opening and collapsing of cart 12, for example, by constraining relative motion of components of cart 10 along predetermined paths.

In embodiments, cart 10 may include a dampener (not shown in the figures) configured to resist collapse of the collapsible cart. For example, the dampener may be present inside column 16, or coupled to column 16, or inside braces 58 or 60, or couple braces 58 or 60 to other components of cart 10. In embodiments, the dampener may include one or more of a hydraulic dampener, a gas dampener, or a spring dampener.

In embodiments, cart 10 further includes plurality of wheels 66 coupled to a bottom side of frame 12. In embodiments, the plurality of wheels 66 comprises a movable wheel 66a adjacent second frame portion 20 of cart 10, wherein movable wheel 66 is pivotable relative to cart 10. For example, movable wheel 66a may be secured adjacent or on second frame portion 20 being a rear portion of cart 10. In embodiments, the plurality of wheels 66 includes two movable wheels 66a.

In embodiments, the plurality of wheels 66 includes a fixed wheel 66b adjacent first frame portion 18 of cart 10. The fixed wheel is not pivotable relative to cart 10. For example, fixed wheel 66b may be secured adjacent or on first frame portion 18 being a front portion of cart 10. In embodiments, the plurality of wheels 66 includes two fixed wheels 66b. Providing one or more fixed wheels 66b at a front of cart 10 and one or more pivotable wheels 66a at a rear of cart 10 may facilitate unintended spinning, translation, or other motion of cart 10, and cart 10 may substantially maintain an intended trajectory along a direction of travel.

One or more of wheels 66 may be provided with a respective wheel lock 68. Wheel lock 68 may be foot-operated to lock or unlock a respective wheel 66. Locking of wheel 66 with wheel lock 68 may help avoid unintended motion or movement of cart 10.

Shelves of cart 10 may be used to hold objects. Cart 10 may include further components or structures to facilitate holding objects.

For example, cart 10 may include a horizontal mesh basket 70 secured to collapsible frame 12. Basket 70 may be secured to frame 12 in a fixed configuration. Basket 70 may be formed of one or more of metal, alloy, or plastic. In embodiments, basket 70 is formed of metal or alloy, and optionally may have a plastic coating.

Cart 10 may include further components for holding objects, as described with reference to FIG. 3.

Figure 3:
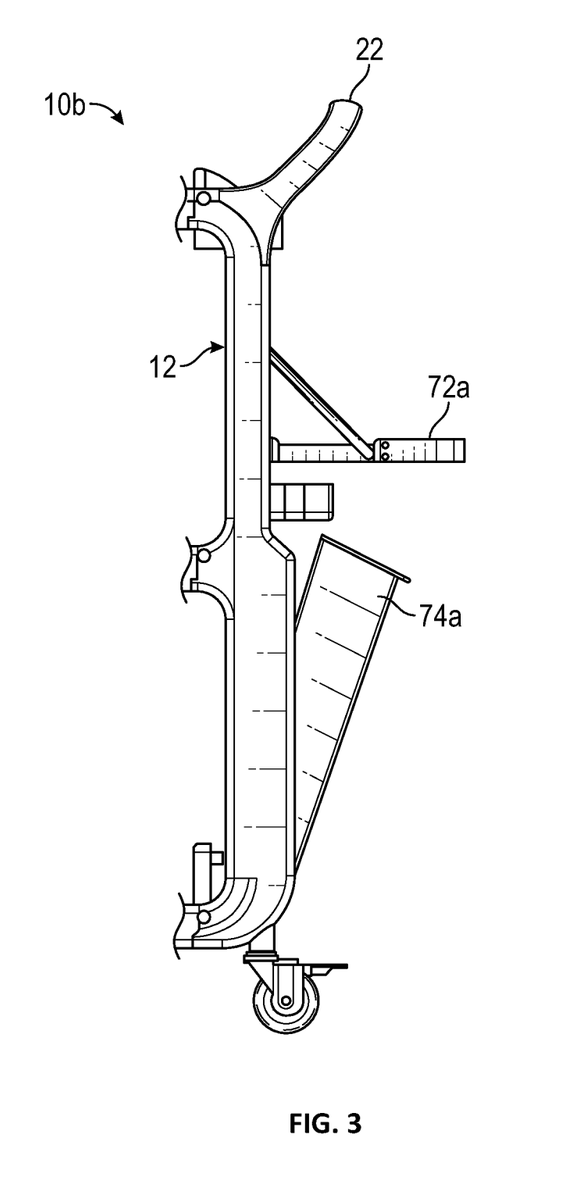
FIG. 3 is a side view of the collapsible cart of FIG. 1A in a tray-open configuration.

FIG. 3 is a side view of collapsible cart 10 of FIG. 1A, in a tray-open configuration 10b. In embodiments, cart 10 further includes a folding tray 72 movable between a vertical stowage configuration (shown in FIG. 1A) and a horizontal open configuration 72a (shown in FIG. 3), wherein foldable tray 72 is pivotably secured to frame 12. In embodiments, foldable tray 72 is pivotably secured to frame 12 above foldable shelf 14. Folding tray 72 may be formed of any suitable rigid material for holding objects. Folding tray 72 may be formed of one or more of metal, alloy, or plastic. In embodiments, folding tray 70 is formed of metal or alloy, and optionally may have a plastic coating.

In embodiments, cart 10 further includes a tilting basket 74 movable between a vertical stowage configuration (shown in FIG. 1A) and a tilted open configuration 74a (shown in FIG. 3). In embodiments, tilting basket 72 is pivotably secured to frame 12. In embodiments, tilting basket 72 is pivotably secured to frame 12 below foldable shelf 14. Thus, collapsible carts according to various embodiments of the disclosure may be used to hold and transport one or more objects.

In embodiments, two or more carts according to the disclosure may be secured or entrained (coupled) with each other, facilitating transport of two or more carts.

Figure 4:
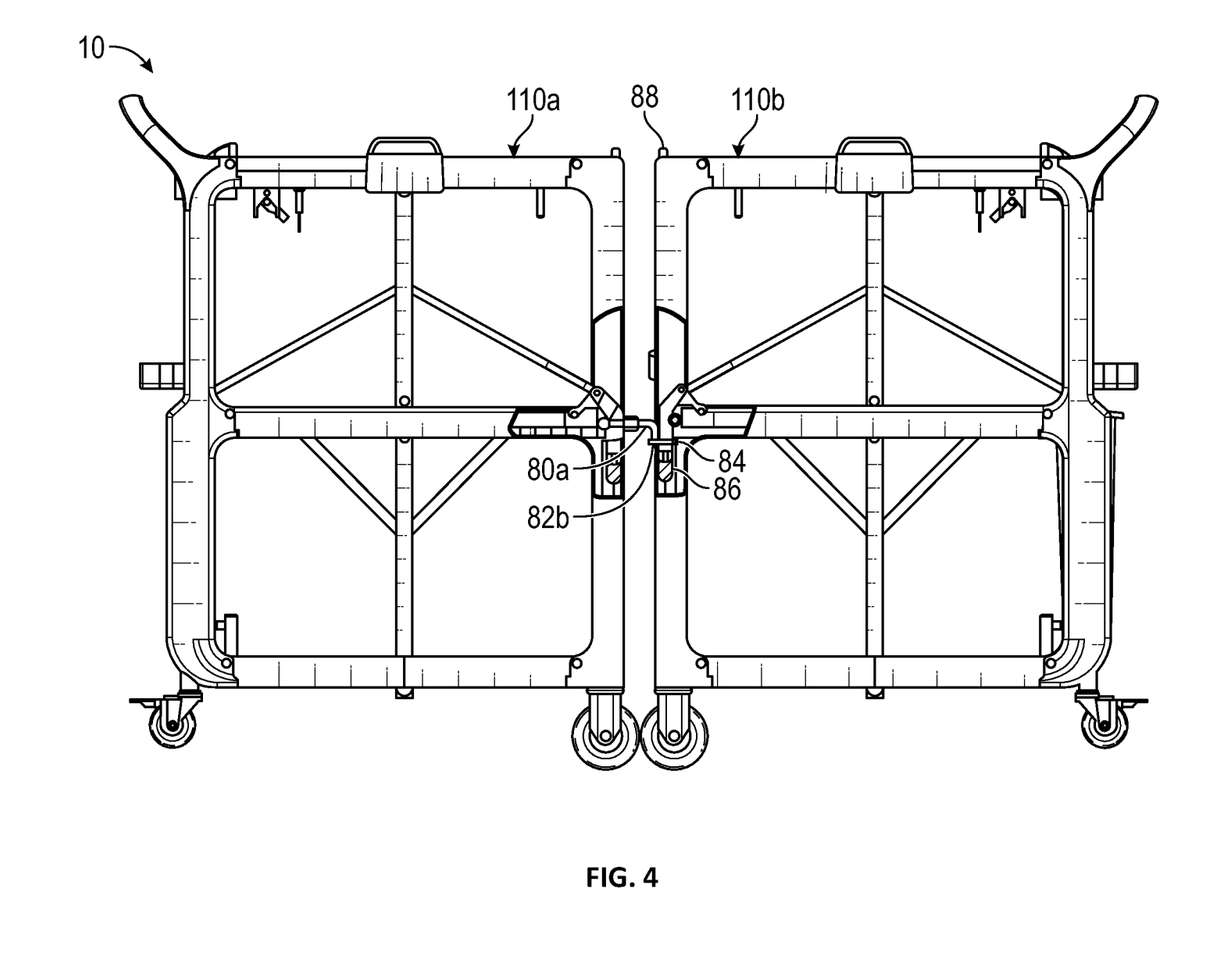
FIG. 4 is a side view of an assembly including two collapsible carts coupled in a front-to-front configuration.

FIG. 4 is a side view of an assembly 100 including two collapsible carts 110a and 110b entrained front-to-front. Carts 110a and 110b may be substantially similar to cart 10 as described with reference to FIGS. 1A to 3. Components are described with reference to cart 10 of FIGS. 1A to 3 for convenience, but will be understood to be part of carts 110a or 110b of FIG. 4 in appropriate embodiments.

In embodiments, cart 10 further includes an entraining rod 80 (shown in FIG. 1A) secured to collapsible frame 12, and an entraining slot 82 (shown in FIG. 1B) defined by collapsible frame 12. Entraining slot 82 may be defined by a separate component secured to frame 12. In embodiments, entraining rod 80 is secured to first frame portion 18, and entraining slot 82 is defined by first frame portion 20. Entraining slot 82 of first portion 18 of cart 10 is configured to receive a respective entraining rod of a front portion another collapsible cart to entrain collapsible cart 10 to the other collapsible cart, front-to-front. For example, as shown in FIG. 4, entraining rod 80a of cart 110a is received in entraining slot 82b of cart 110b to entrain carts 110a and 110b. Assembly 100 may be moved or stored, so that carts 110a and 110b are moved or stored together.

In other embodiments, one of entraining rod 80 and entraining slot 82 may be along a front (or first portion 18) of cart 19 and the other of entraining rod 80 and entraining slot 82 is along a rear (or second portion) of cart 10 for entraining carts front-to-back.

In embodiments, entraining rod 80 and entraining slot 82 extend substantially horizontally and parallel to surface of foldable shelf 14, as shown in FIGS. 1A to 4. In other embodiments, entraining rod 80 and entraining slot 82 may have a vertical or inclined configuration. While single entraining rod 80 and slot 82 are shown in FIGS. 1A to 4, cart 10 may include multiple entraining structures.

In embodiments, cart 10 further includes a rod lock 84 (shown in FIG. 4) adjacent entraining slot 82b configured to secure respective entraining rod 80a of another collapsible cart received in entraining slot 82b. Rod lock 84 may include metal, alloy, plastic, or any suitable material. In embodiments, rod lock 84 is biased by a biasing element 86 to hold respective entraining rod 80a. In such embodiments, collapsible cart 10 includes a release bar 88 coupled to biasing element 86, where release bar 88 is depressible to cause rod lock 84 to disengage and release respective entraining rod 80a. In this way, assembly 100 can be dissembled to release (uncouple) carts 110a and 110b.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A collapsible cart comprising:
   a collapsible frame comprising a first frame portion and a second frame portion, the collapsible frame configured to move between an open configuration and a collapsed configuration by relative translation between the first frame portion and the second frame portion;
   a foldable shelf extending between the first frame portion and the second frame portion, wherein the foldable shelf is configured to fold to allow the frame to move from the open configuration to the collapsed configuration;
   an interior support column transversely extending through a column slot defined by the foldable shelf;
   at least one column brace slidably coupling the frame to the column; and
   at least one shelf brace that slidably couples the foldable shelf to the column.

2. The collapsible cart of claim 1, wherein the interior support column is disposed between the first frame portion and the second frame portion.

3. The collapsible cart of claim 1, wherein the collapsible frame comprises a latch assembly for securing the first frame portion to the second frame portion in the collapsed configuration and a release assembly configured to release the latch assembly to permit opening of the cart.

4. The collapsible cart of claim 3, wherein the latch assembly comprises a first latch portion disposed on the first frame portion, and a second latch portion disposed on the second frame portion.

5. A collapsible cart comprising:
a collapsible frame comprising a first frame portion and a second frame portion, the collapsible frame configured to move between an open configuration and a collapsed configuration by relative translation between the first frame portion and the second frame portion;
a foldable shelf extending between the first frame portion and the second frame portion, wherein the foldable shelf is configured to fold along a hinge that allows the frame to move from the open configuration to the collapsed configuration;
an interior support column transversely extending through a column slot defined by the foldable shelf;
at least one column brace slidably coupling the frame to the column; and
at least one shelf brace slidably coupling the foldable shelf to the column.

6. The collapsible cart of claim 5, wherein the foldable shelf comprises:
a first shelf portion defining a first hinge channel of the hinge;
a second shelf portion defining a second hinge channel of the hinge, and
a hinge pin passing through the first hinge channel and the second hinge channel.

7. The collapsible cart of claim 5, wherein the foldable shelf is a middle foldable shelf, wherein the collapsible cart further comprises an upper foldable shelf above the middle foldable shelf, and wherein the collapsible cart further comprises a lower foldable shelf below the middle foldable shelf.

8. The collapsible cart of claim 5, further comprising a shelf lock configured to slide between a locked position that retains the cart in the open configuration and an unlocked position that permits the cart to collapse to the collapsed configuration, wherein the foldable shelf is a middle foldable shelf, and wherein the collapsible cart further comprises an upper foldable shelf above the middle foldable shelf, wherein the upper foldable shelf defines a rail, wherein the shelf lock is slidably secured to the rail.

9. The collapsible cart of claim 8, wherein the upper foldable shelf comprises a shelf hinge, wherein the shelf lock extends across the shelf hinge in the locked position to prevent folding of the shelf hinge, and wherein the shelf lock is spaced from the shelf hinge in the unlocked position to allow folding of the shelf hinge.

10. The collapsible cart of claim 9, wherein the shelf lock defines a grip for holding and sliding the shelf lock along the rail.

11. The collapsible cart claim 5, further comprising an entraining rod secured to the collapsible frame, and an entraining slot defined by the collapsible frame, wherein the entraining slot is configured to receive a respective entraining rod of another collapsible cart to entrain the collapsible cart to the other collapsible cart.

12. The collapsible cart claim 11, further comprising a rod lock adjacent the entraining slot configured to secure a respective entraining rod of another collapsible cart received in the entraining slot.

13. The collapsible cart of claim 12, wherein the rod lock is biased by a biasing element to hold the respective entraining rod, wherein the collapsible cart comprises a release bar coupled to the biasing element, wherein the release bar is depressible to cause the rod lock to disengage and release the respective entraining rod.

14. The collapsible cart of claim 5, wherein the at least one shelf brace has a first shelf brace end secured to the foldable shelf and a second shelf brace end slidably secured to the support column.

15. The collapsible cart of claim 5, wherein the at least one column brace has a first column brace end secured to the collapsible frame and a second shelf brace end slidably secured to the support column.

16. The collapsible cart of claim 5, further comprising a dampener configured to resist collapse of the collapsible cart.

17. The collapsible cart of claim 5, further comprising a folding tray movable between a vertical stowage configuration and a horizontal open configuration, wherein the foldable tray is pivotably secured to the frame above the foldable shelf.

18. The collapsible cart of claim 5, further comprising a tilting basket movable between a vertical stowage configuration and a tilted open configuration, wherein the tilting basket is pivotably secured to the frame below the foldable shelf.

19. The collapsible cart of claim 1, further comprising a plurality of wheels coupled to the bottom of the frame, wherein the plurality of wheels comprises two movable wheels adjacent to the second frame portion of the cart, wherein the two movable wheels are pivotable relative to the cart, wherein the plurality of wheels comprises two fixed wheels adjacent a first frame portion of the cart, and wherein the two fixed wheels are not pivotable relative to the cart.

20. A collapsible cart comprising:
a collapsible frame comprising a front frame portion and a rear frame portion, the collapsible frame configured to move between an open configuration and a collapsed configuration by relative translation between the front frame portion and the rear frame portion;
an upper foldable shelf, a middle foldable shelf, and a lower foldable shelf, wherein each of the upper, middle, and lower folding shelves extend between the front frame portion and the rear frame portion, wherein each of the upper, middle, and lower folding shelves are configured to fold to allow the frame to move from the open configuration to the collapsed configuration;
an interior support column extending from the upper foldable shelf to the lower foldable shelf through a column slot defined by the middle foldable shelf;
a front column brace slidably coupling the front frame portion to the column;
a rear column brace slidably coupling the rear frame portion to the column;
a front shelf brace slidably coupling a front portion of the middle foldable shelf to the support column; and
a rear shelf brace slidably coupling a rear portion of the middle foldable shelf to the support column.

* * * * *